United States Patent
Donovan et al.

(10) Patent No.: US 6,920,632 B2
(45) Date of Patent: Jul. 19, 2005

(54) DYNAMIC MULTILEVEL TASK MANAGEMENT METHOD AND APPARATUS

(75) Inventors: Brian Donovan, Vancouver, WA (US); Ray S. McKaig, Vancouver, WA (US); William B. Dress, Camas, WA (US)

(73) Assignee: Xyron Corporation, Vancouver, WA (US)

( * ) Notice: Subject to any disclaimer, the term of this patent is extended or adjusted under 35 U.S.C. 154(b) by 0 days.

(21) Appl. No.: 10/227,050

(22) Filed: Aug. 23, 2002

(65) Prior Publication Data

US 2004/0039455 A1 Feb. 26, 2004

(51) Int. Cl.$^7$ ................................................. G06F 9/46
(52) U.S. Cl. ....................... 718/103; 718/104; 710/264; 710/244
(58) Field of Search ........................ 718/100, 102–104; 710/40–48, 1, 260, 240, 244, 264, 265; 709/102–104

(56) References Cited

U.S. PATENT DOCUMENTS

| | | | |
|---|---|---|---|
| 3,947,824 A | 3/1976 | Doehle et al. | |
| 4,216,528 A | * 8/1980 | Robertson | ..................... 700/95 |
| 5,088,024 A | 2/1992 | Vernon et al. | |
| 5,564,062 A | 10/1996 | Meaney et al. | |
| 5,625,846 A | 4/1997 | Kobayakawa et al. | |
| 5,710,936 A | 1/1998 | Meaney et al. | |
| 5,715,472 A | 2/1998 | Meaney et al. | |
| 5,774,734 A | 6/1998 | Kikinis et al. | |
| 5,774,735 A | 6/1998 | Meaney et al. | |
| 5,862,360 A | 1/1999 | Meaney et al. | |
| 5,905,898 A | * 5/1999 | Qureshi et al. | .............. 710/266 |
| 5,987,601 A | 11/1999 | Donovan | |
| 6,003,060 A | * 12/1999 | Aznar et al. | ................. 718/103 |
| 6,587,865 B1 | * 7/2003 | Kimbrel et al. | ............. 718/104 |
| 6,757,897 B1 | * 6/2004 | Shi et al. | ..................... 718/102 |
| 2002/0082734 A1 | * 6/2002 | Amrhein et al. | |

\* cited by examiner

*Primary Examiner*—Anthony Knight
*Assistant Examiner*—Crystal J Barnes
(74) *Attorney, Agent, or Firm*—Chernoff, Vilhauer, McClung & Stenzel, LLP

(57) ABSTRACT

A method for the orderly execution of multiple tasks in a data processing system and a circuit for implementing that method include a plurality of task modules which construct bids based upon the order of the task and its priority. The highest priority highest order number tasks are switched to available system execution resources. The system permits the orderly execution of round-robin task sets in an environment of dynamically changing priorities. When a round-robin task set is interrupted, the system is able to return to the round-robin task set after execution of the higher priority task at the exact point the interruption occurred.

9 Claims, 4 Drawing Sheets

DYNAMIC MULTILEVEL TASK MANAGEMENT METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, TABLE, OR COMPUTER PROGRAM LISTING COMPACT DISK APPENDIX

Not applicable.

BACKGROUND OF THE INVENTION

The following invention relates to an apparatus and method for allocating the execution resources of a data processing system among a plurality of tasks competing for system resources whose priorities are dynamically changing. At the same time, the apparatus maintains the order of linked tasks as might be encountered in a round robin set or group of sets.

Management of tasks having dynamically changing priorities such as a set of multiply interacting round-robin sets is typically accomplished in software by the operating system. The software maintains dynamically changing linked lists. Such lists are typically kept in memory and their access and management necessarily consume a plurality of CPU cycles. One approach to dealing with this complex problem is to employ a general-purpose processor devoted specifically to priority management. Other methods simply assign priority management to a special-purpose operating-system task. In either case, complex code must be written and maintained and CPU cycles that could be profitably employed elsewhere are consumed in task management. As the number of tasks increases, their potential interaction and hence the functional complexity of the management software and the time necessary to execute the software instructions can increase factorially while the linked-list data structure increases as the square of the number of tasks. Thus, the complexity and cost in CPU cycles of a system of 8 tasks could be, in the extreme case, as much as 1600 times that of a system of only 4 tasks. Clearly the commonly used method of task management via priority structures quickly exceeds the capacity of any presently available computing system as the number of tasks increases.

BRIEF DESCRIPTION OF THE PRIOR ART

U.S. Pat. No. 5,564,062 discloses a means and apparatus for assigning a preselected task to any of several resources based on a priority token that is passed from task to task by a mechanism external to the patent.

U.S. Pat. No. 5,625,846 teaches a means of dequeuing a message according to the priority of the message.

U.S. Pat. Nos. 5,774,734, 5,710,936, 5,715,472, 5,774,735, and 5,862,360 by Meaney et al. teach a method of sharing system resources with regards to power conservation.

U.S. Pat. No. 5,088,024 discloses a means of resource allocation arbitration protocols, particularly for communication bus request arbitration.

U.S. Pat. No. 3,947,824 teaches a means of priority selection for service or access wherein higher priority elements are given preferential service but not to the exclusion of service to lower priority elements.

The present invention overcomes the difficulties of software supervision and lost CPU cycles by means of specialized circuitry designed specifically for task management. In the preferred embodiment, there are no lost CPU cycles and the hardware circuit functions independently of software intervention, apart from a simple initialization process to load task priorities into hardware task modules and appropriately set active flags.

BRIEF SUMMARY OF THE INVENTION

In the following discussion, "next task" refers to the next task scheduled to execute or to gain access to some system resource and "waiting task" is to be understood as the "next task."

The invention relates to managing a set of tasks by means of assigned priorities. The priority of any task may be assigned and altered on a dynamic basis by the task itself as well as other tasks in the set. This web of dynamically changing priorities can result in a subset of tasks all at the same priority level; such a subset is termed a "round-robin" set. If the priority of the round-robin set is at the highest priority level in the set of tasks, each task in the round-robin set must have equal access to execution resources, ideally simultaneously. Typically, however, the number of execution units is much less than the number of tasks; in many of cases there may be but a single execution unit. To ensure equitable execution of the round-robin set of tasks in the case of limited resources, each task in the round-robin set is given access to the next available resource in a sequential fashion such that each task in the round-robin set is given its turn to run and no task in the round-robin set is allowed to run again until all tasks in the set have executed.

Of course, any task, whether belonging to any round-robin set or not, whose priority dynamically increases beyond that of the next task, whether belonging to any round robin set or not, must be allowed to interrupt the next task and start its own execution in a timely fashion. Should this occur, the state of the next task and its position in the round-robin set must be noted so round-robin access to system resources can resume at the point where it left off. It may also occur that a round-robin set achieves a priority higher than the next task that belongs to a round-robin set. That is, in the general case a set of tasks may take precedence over a set of putative next tasks, where the number of tasks in each set may be greater than or equal to one.

In a system of dynamically increasing task priority where each task may have a different rate of priority increase, a given round-robin set retains its identity as set of specific tasks only within the time period between priority increase commands. Additionally, the priority of tasks can be raised or lowered dynamically by one or more tasks in the round robin set, effectively creating a self-referential round-robin set leading to recursive task management structures. Thus, the management of a round-robin set is a time-critical function as tasks can enter and leave the set as rapidly as task activation and deactivation.

In contrast to the above cited art, the present invention discloses a method and apparatus for managing a set of dynamically varying priorities. The system has no explicit "knowledge" of a round-robin situation, yet is able to arbitrate round-robin situations dynamically even where such round-robin sets may dynamically reach higher priority levels than the executing set.

BRIEF DESCRIPTION OF THE SEVERAL DRAWINGS

DETAILED DESCRIPTION OF THE INVENTION

Figure 1:
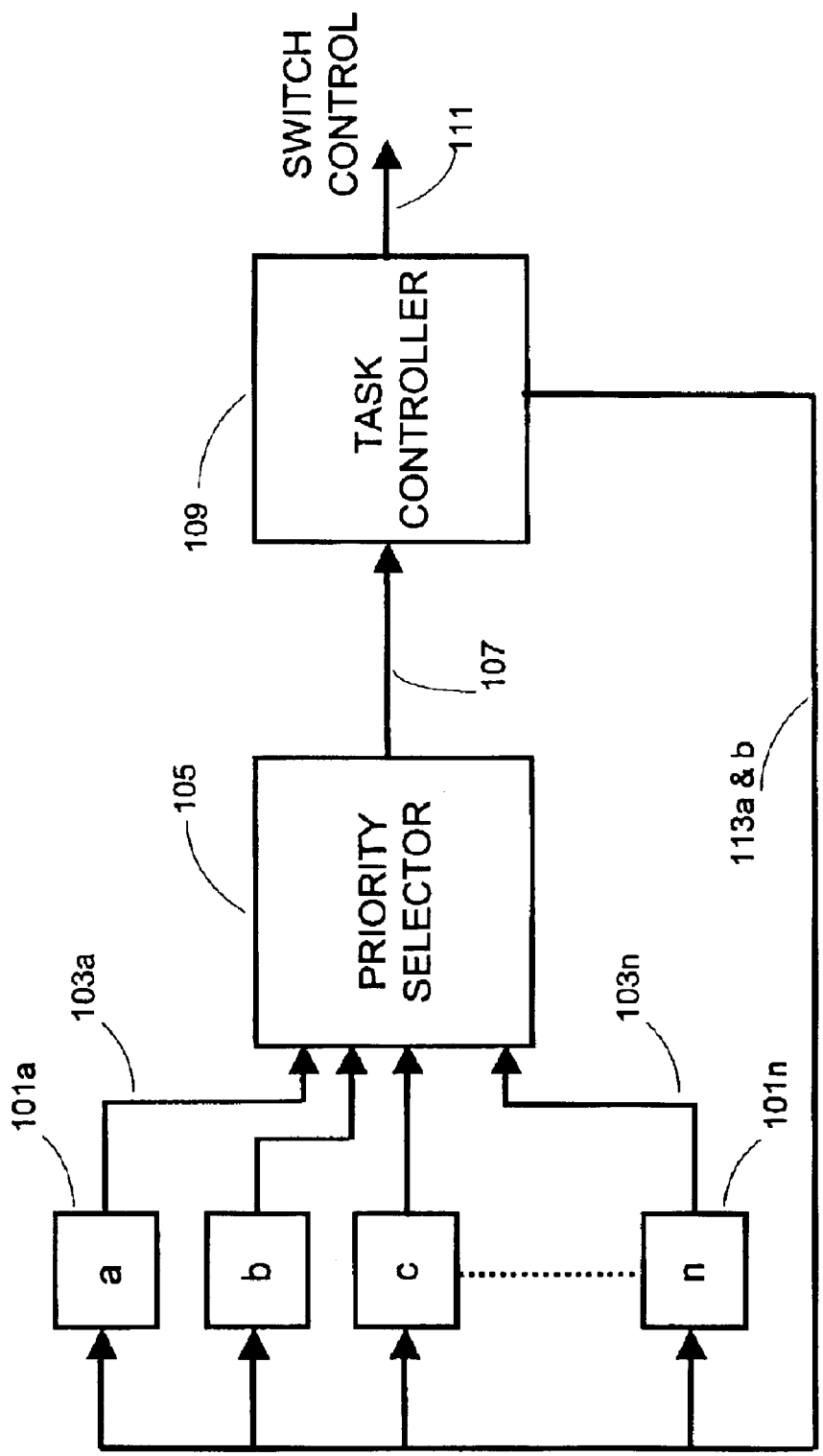
FIG. 1 is a block schematic diagram of the circuit of the invention.

Referring to FIG. 1, the task-selection process commences with Task Modules 101a through 101n presenting their individual priority bids from contending tasks for access to the next available execution unit to the Priority Selector 105 via the Priority Bid lines 103a through 103n. In the preferred embodiment, Priority Selector 105 is implemented as a binary tree structure although other means, such as a pairwise comparison of each bid sequentially with the contents of a register containing the momentary bid winner also furnishes the correct information. In the preferred embodiment, each Priority Bid line 103a through 103n comprises a plurality of bits that represent the respective contending task priority adjoined to a fractional part consisting of a single bit. Task priority may be considered as the integral part of the bid while the bid bit may be considered to be the fractional part. A task, when activated, has the fractional part bit set to 1, effectively increasing the bid value by one half beyond the value represented by the task priority, that is, by interpreting the fractional part bit, when set, as a fractional binary part value of ½.

The winning priority is presented by the Priority Selector 105 via Line 107 to Task Controller 109. An identification (ID) tag representing the order of the task in the list of Task Modules 101a through 101n is also presented to the Task Controller 109 via the Line 107. Task Controller 109 generates priority bid information that is fed back to the individual Task Modules 101a through 101n via Task Module Control lines 113a and 113b. The priority bid or Task-Module-Control information comprises the winning bid and the task ID tag, the information also being passed via Switch Control line 111 to provide control over presenting the winning task as the next task to gain access to the sought resource.

Figure 2:
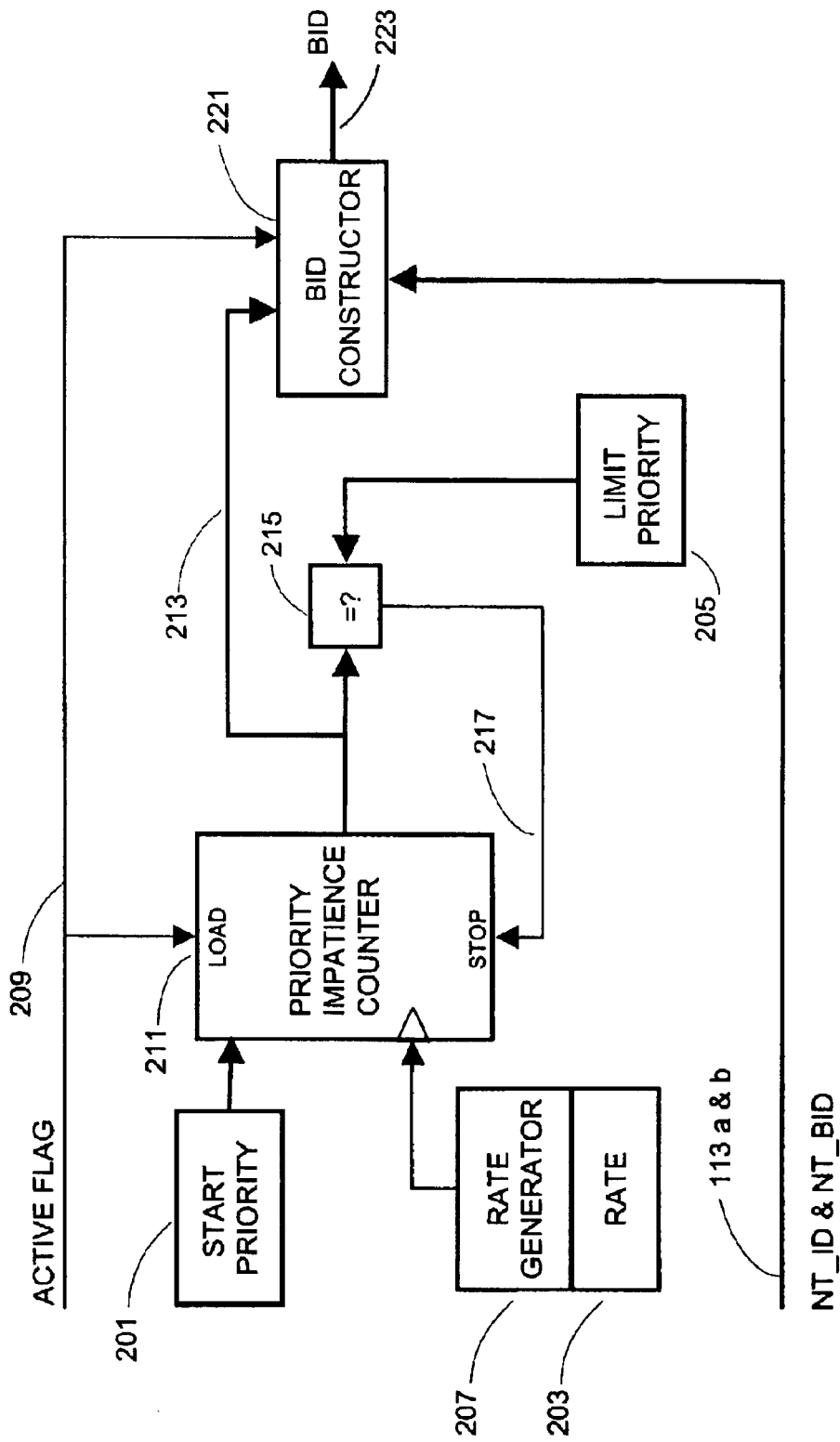
FIG. 2 is a block schematic diagram of a task module of FIG. 1.

FIG. 2 shows a block diagram depicting a Task Module, there being one such module for each allocated system task. Upon task initialization, the starting priority code is loaded into Starting Priority Register 201, the rate of increase is loaded into Rate Register 203, and the limit or high priority code is loaded into Limit Priority Register 205. When the Active Flag on Line 209 goes high, Start Priority 201 is loaded into Priority Impatience Counter 211 and Rate Generator 207 is enabled. Additionally, Bid Constructor 221 is allowed to pass its Bid 223 to Priority Selector 105 of FIG. 1.

Rate Generator 207 increases Priority Impatience Counter 211 according to the contents of Rate Register 203 thus dynamically increasing that task's priority code which is presented on Task Priority Line 213. The software system, e.g., another task, may change these register values as necessary, effecting a dynamic alteration in task priority. Priority Comparator 215 compares the task's present priority, present on Task Priority line 213, with high Limit Priority 205. When these priority levels are equal, Priority Impatience Counter 211 maintains the task priority on Task Priority line 213 at high Limit Priority 205 by stopping the Priority Impatience Counter 211 by way of line 217. A task may be prevented from bidding if it is blocked by Bid Constructor 221, the blocking occurring when Active Flag 209 is low; the remaining control information for Bid Constructor 221 is furnished on lines 113a and 113b, the Bid Constructor 221 produces a bid on Bid line 223.

Figure 3:
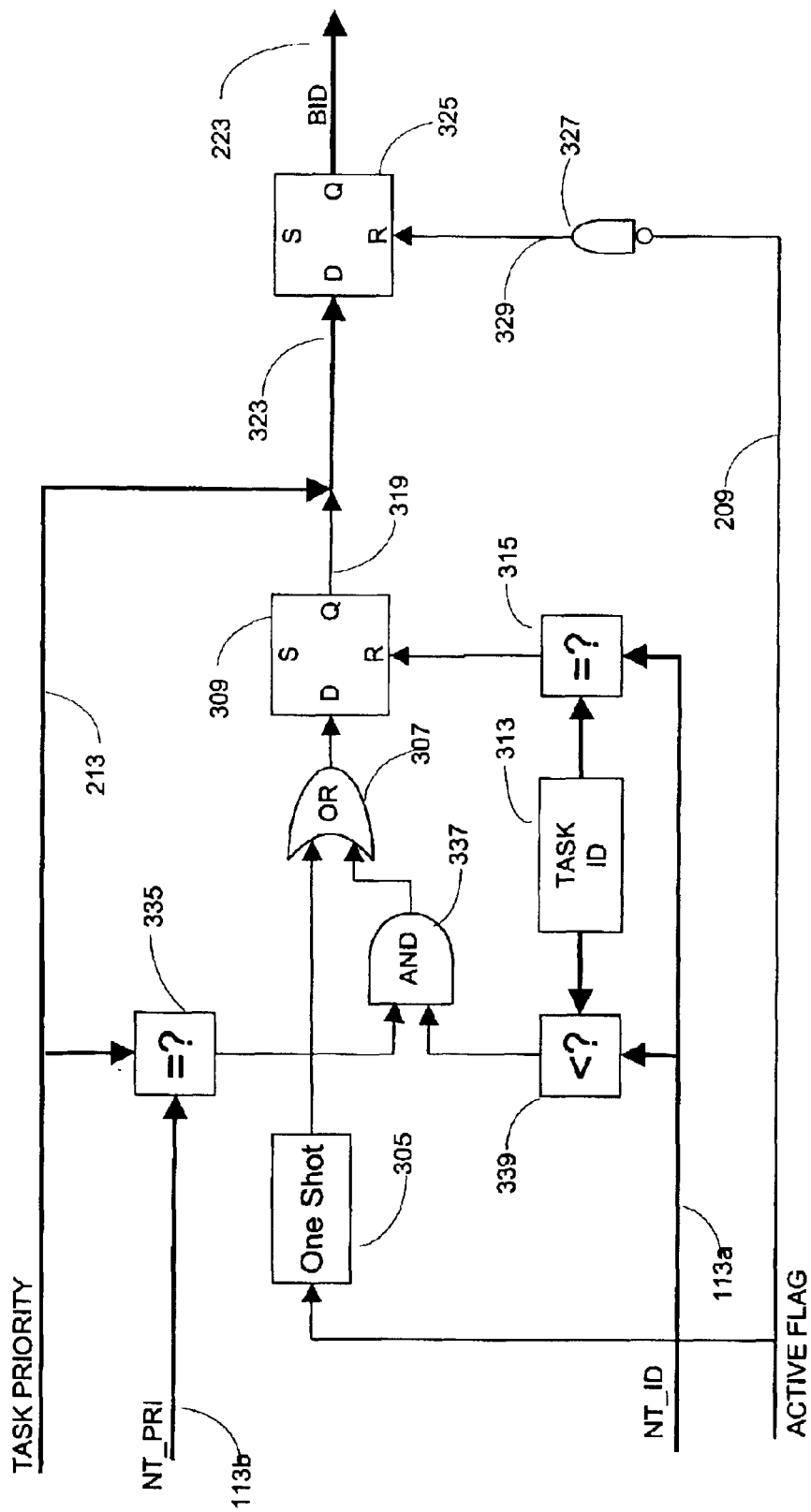
FIG. 3 is a block schematic diagram of a bid constructor of FIG. 2.

The preferred implementation of Bid Constructor 211 is to be understood by referring to FIG. 3, where bold connections indicate a bid or ID data bus and thin lines represent control and logic information. Assume that the resource or execution unit in question is presently servicing a task and that the next task to be serviced is to be one of a plurality of contending tasks residing in Task Modules 101a through 101n of FIG. 1. Each active contending task, as determined by Active Flag Line 209 is allowed to present its bid on Bid Line 223 to Priority Selector 105 of FIG. 1.

A bid is constructed when Active Flag Line 209 goes high; the rising edge is converted by One Shot Latch 305 to a pulse that is passed via OR Gate 307 to Latch 309. Assuming that the next-task ID present on Line 113a is not equal to that of the currently contending task, Latch 309 is not in a reset state, as determined by comparing present Task ID 313 by means of Comparator 315 with next-task ID present on Line 113a. The fractional part of the bid at True or "1" state represents a ½ in the task-active state and zero otherwise; this fractional part is latched by Latch 309 and presented to Latch 325 via Fractional Part Line 319.

The Task ID such as present on next-task ID Line 113a is determined by the order of Task Modules as shown in FIG. 1 with the lowest integer task ID being zero and referring to Task Module 101a and the highest integer task ID being n referring to Task Module 101n. The task ID integers reside within fixed registers within each Task Module of FIG. 1 and indicated as Task ID 313 in FIG. 3; the register contents are available to the task management structure as described below.

When combined with Task Priority 213 from Priority Impatience Counter 211 of FIG. 2, the fractional part forms a bid on Line 323 consisting of an integral priority part and a fractional round-robin control part. As long as the task is active, Latch 325 is not reset as determined by Inverter 327, thus the bid is passed on Bid Line 223 to Priority Selector 105 of FIG. 1.

Priority Selector 105 selects the highest bid among all actively bidding contending tasks and presents winning task information to Task Controller 109 and the winning task is designated as the next task to gain access to a system resource or execution unit. The next task priority bid information is passed back to all Task Modules 101a through 101n on lines 113a and 113b as described above. If there is a plurality of tasks at the winning bid, the last such task is declared the winning task by means of ordering achieved by the circuitry of the Priority Selector 105. The task becomes the next task to gain access to a system resource or execution unit. At that point in the management process, one of the tasks will have a Task ID 313 equal to the Next Task ID present on Line 113a. Output of Comparator 315 will then cause Latch 309 to reset, changing the fractional part of the bid on Line 319 to zero, leaving only the integral part. The effect is that the bid next presented by the Task Module will be less than its current bid, unless Priority Impatience Counter 211 of FIG. 2 or other software intervention causes an increase in the task's priority before the next bidding round. The next bid is then less than any of the possible plurality of winning bids at the task priority in question.

The next task to be serviced may be preempted by another task receiving a priority higher than the next task before the next task is presented to a servicing resource. Should preemption occur, the next task to run is replaced by the new winning task upon completion of the next bidding sequence. To ensure that the replaced task maintains its winning bid for a subsequent bidding round, the Fractional Part on line 319 is forced to present a "1" on Line 319 as described above. This action effectively reinserts the replaced task into its original place in the bidding, assuming that all other priorities remain unchanged.

Once the next task has completed its work it is deactivated. Upon deactivation, Inverter 327 ensures that Latch 325 is reset via Line 329 thus presenting a logic "0" as the task bid on Bid Line 223.

In case the next task, once gaining access to the desired system resource, does not complete due to a possible limit placed on its access time or number of cycles, the task is not deactivated. Since it has not completed its work, the task must be allowed to bid for subsequent resource access. However, its bid value is ½ unit less than other tasks at the same priority level. This enables those tasks to win access to system resources in an equitable manner. In this fashion, the round-robin set of tasks is sequentially given access to desired resources.

When the round-robin set has been exhausted such that no task in the round-robin set is able to bid at its priority level plus the fractional part of ½, the next task in the round robin set that wins the bid is the first task of the prior bidding round as the task retains its overall position in the list of Task Modules. This winning task becomes the next task to gain access as described above. However, the fractional part of the task is zero and must remain zero in accordance with the above discussion. However all subsequent tasks in the round-robin set must have their fractional part reset to ½ so bidding can resume as described above.

Circuitry achieving the above goals is described by referring again to FIG. 3. The bid value of the next task is present on Line 113b. The priority of the next task present on Line 113b is presented to Comparator 335 where it is compared with the task priority present on Line 213. The comparison result is presented to AND Gate 337. Meanwhile, next task ID present on Line 113a in compared to Task ID 313 via Comparator 339, which outputs a value of True or logical level "1" to AND Gate 337 if the next task ID on Line 113a has a value less than the value of the current Task ID 313. A logic level "0" is presented otherwise. The result of summing the outputs of Comparator 335 with that of Comparator 337 in a logical AND gate is presented to Latch 309 via OR Gate 307 and the result is the fractional part which is combined with Task Priority 213 and provides the input to Latch 325. This operation occurs for each Task Module 101a through 101n of FIG. 1 with the overall result that any task that having an ID value less than that of the next task and having priority level equal to that of the next task will bid on the subsequent bidding round at a priority level increased by ½ due to the fractional part. This effectively places all tasks but the next task within the round-robin set in their original round-robin configuration.

It is to be understood from the above description that the invention manages a plurality of tasks, each having dynamically changing priority levels, and the plurality of tasks possibly partitioned into a plurality of round-robin sets; said management being fair and equitable by allowing each task to gain access to required system resources according to its priority at the moment of task selection.

An alternate method of effecting an equitable round-robin management process is to establish two classes of tasks; those that require round-robin management will be called "blockable" tasks and those tasks each having a unique priority level are termed "non-blocked" or "normal" tasks. The alternate method requires two priority comparisons, preferentially done as identical tree structures each producing a Multiplicity Flag as well as the winning priority and task ID determined by the sequential position in the structure of Task Modules as above. One priority-comparison mechanism is reserved for the set of unblocked tasks, the other returns equivalent information for the set of blocked tasks. The two results are compared. If the priorities of the two winners are equal, the unblocked task is always chosen, otherwise the higher priority task is chosen. The logic of this alternate method is identical to that of the preferred method, although the particular implementation differs.

Additionally, an alternate mechanism for identifying multiplicity at the winning priority level in parallel with priority comparison would be to assign a register to the multiplicity and another register to the winning priority. At each priority comparison step, the priority to be examined would be compared to the contents of the priority register. Should the priority being examined be less than the contents of the priority register, no action is taken. Should the priority be greater, the contents of the priority register are replaced with that greater value and the contents of the multiplicity register are reset to zero. Should the two priorities be equal, the contents of the multiplicity register are incremented by one. This mechanism is explained in detail below.

Figure 4:
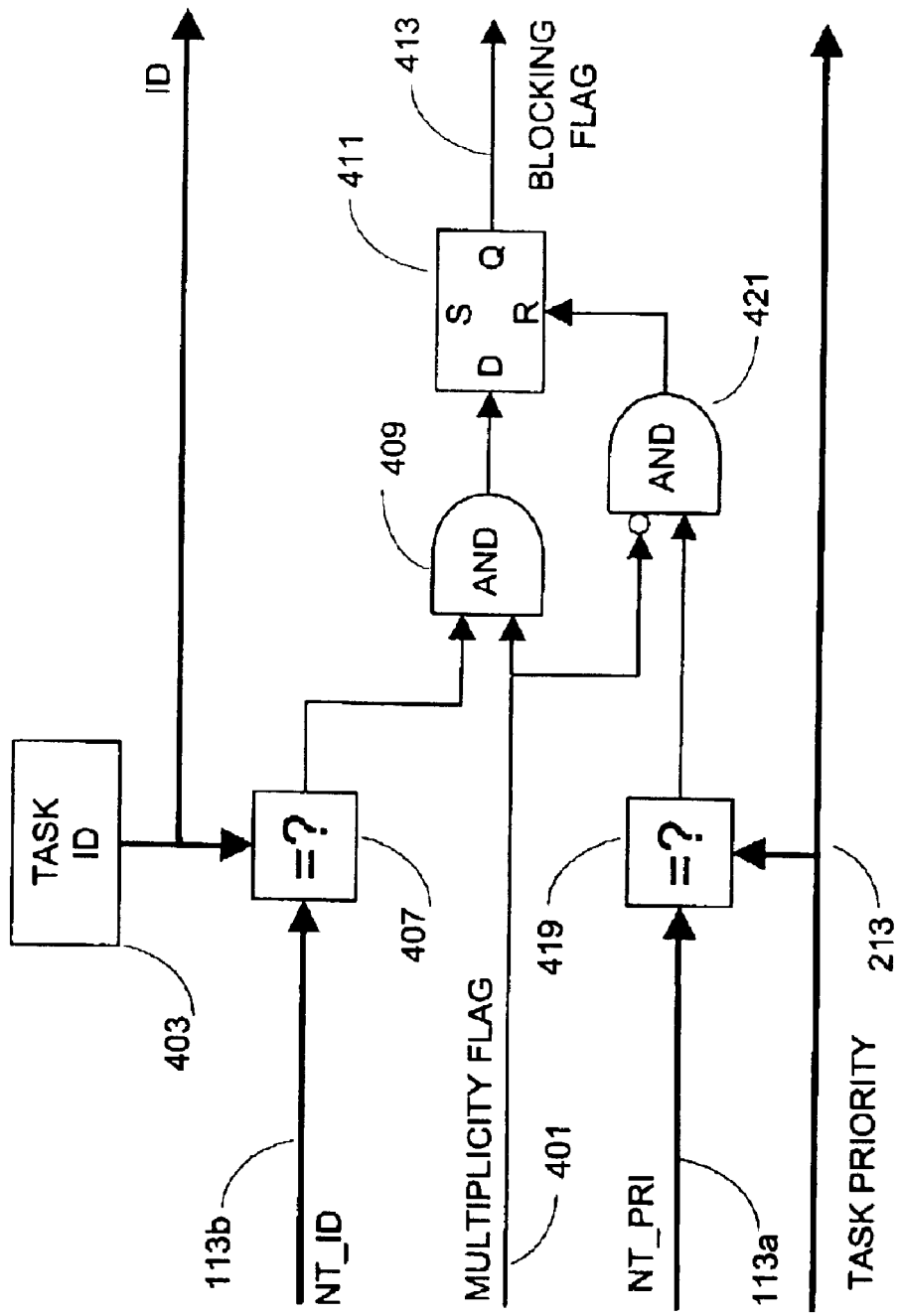
FIG. 4 is a block schematic diagram of an alternative bid constructor circuit.

Referring to FIG. 4, Alternate Bid Constructor, a task is moved from the unblocked category to the blocked category when Multiplicity Flag 401 is True and the Task ID 403 is equal to the Next Task ID 113a as determined by Comparator 407. The results of the comparison are combined with Multiplicity Flag 401 in AND Gate 409. The output of AND Gate 409 is latched in Latch 411, latching a "1" as the value of the Blocking Flag 413. A value of "1" or True for the Blocking Flag indicates that the corresponding task is ignored in the unblocked task comparison and participates in the blocked task comparison. In the case of a single winning task at the high priority, the Multiplicity Flag is at level "0" causing the blocking flag for the task in question to remain in state "0".

Blocking Flag 413 is reset to its "0" state when there is only one task at the winning priority and that task is at the same priority level as the next task to gain resource access. This occurs via comparing the next-task priority on Line 113b with current Task Priority 213 via Comparator 419. This result gates the negated value of the Multiplicity Flag 401 via AND Gate 421, resetting Latch 411 and producing a Blocking Flag 413 of value "0".

It will be seen that the method of managing tasks described in the preceding paragraphs produces the equivalent result as the preferred method discussed above but at the cost of additional hardware to manage the Multiplicity Flag, the hardware necessarily being integral with the circuitry to effect the priority comparison.

What is claimed is:

1. In a data processing system, a method of selecting tasks for execution by one or more system resources comprising the steps of:

(a) placing a task set into circuit modules arranged in a predetermined order determined by a task ID code, each of said circuit modules comprising a bid constructor circuit for constructing a bid for each task, said bid comprising at least a priority code and said task ID code, the bid comprising an integral portion and a fractional portion, the integral portion being determined by the priority code and the fractional portion indicating whether the task has been previously executed;

(b) establishing in each of said circuit modules a single priority code for each task in the task set thereby rendering the task set as a round-robin task set;

(c) initiating the execution of the round-robin task set in the order established by the task ID code;

(d) interrupting the execution of the round-robin task set for a new task comprising a second round-robin task set having a higher priority code than the priority code established for the round-robin task set, wherein said priority codes vary dynamically over time; and (e) after the execution of the new task, resuming the execution of the round-robin set while maintaining the order of said round-robin task set as established in step (a).

2. The method of claim 1 wherein tasks having the same priority code are executed in the order represented by the task ID code.

3. The method of claim 1 wherein said bid comprises an integral portion and a fractional portion, the integral portion being determined by said priority code and the fractional portion being determined, at least in part, by said task ID code.

4. The method of claim 1 wherein the operation of said bid constructor circuit is controlled by a multiplicity flag, said flag indicating that a plurality of tasks each have the same priority code, wherein all of said tasks having the same priority code are compared with other tasks in a single priority comparison circuit.

5. The method of claim 1 wherein the operation of said bid constructor circuit is controlled by a blocking bit flag wherein all bids from said bid constructor circuits are compared in a dual priority comparison circuit, one comparison being made for bids having an active blocking bit flag and a second comparison being made for bids having an inactive blocking bit flag, whereby a larger result of the two comparison steps is selected for execution.

6. In a data processing system, a method of selecting tasks for execution by one or more system resources comprising the steps of:

(a) establishing a task set in circuit modules, said circuit modules arranged in a predetermined order determined by a task ID code;

(b) establishing in each of said circuit modules a priority code for each task in the task set;

(c) creating a bid for each task in the task set, the bid comprising a priority code and the task ID code;
  (i) determining if the task ID code of the next task to run matches or is greater than the task ID code of any task in the task set, and
  (ii) determining if the priority code of the next task to run matches the priority code of any task in the task set;

(d) selecting the highest valued bid for execution by a system resource and designating said task as the next task to run;

(e) executing the next task to run, and after the execution of said task, comparing the priority code and task ID code of said task with each of the other tasks in the task set.

7. The method of claim 6 wherein the bid of step (c) includes an integral portion and a fractional portion, the integral portion being determined by the priority code and the fractional portion being determined at least in part by the outcome of steps (i) and (ii).

8. The method of claim 7 wherein the bid is a binary number and the fractional portion of said number is its least significant bit.

9. The method of claim 7 wherein the priority code is allowed to vary dynamically over time.

* * * * *